United States Patent [19]

Satoh

[11] 4,265,270

[45] May 5, 1981

[54] REMOTE-CONTROLLED PRESSURE REGULATOR

[75] Inventor: Ryozo Satoh, Yamato, Japan

[73] Assignee: Tel-Thermco Engineering Co., Ltd., Yokohama, Japan

[21] Appl. No.: 127,005

[22] Filed: Mar. 4, 1980

[51] Int. Cl.³ .......................................... G05D 11/06
[52] U.S. Cl. .............................. 137/505.39; 137/495; 137/505.14; 251/134
[58] Field of Search ............. 137/495, 505.14, 505.37, 137/505.42, 505.39; 251/134

[56] References Cited

U.S. PATENT DOCUMENTS

| | | | |
|---|---|---|---|
| 2,764,996 | 10/1956 | Brown | 137/505.42 X |
| 2,881,792 | 4/1959 | Spence | 137/505.14 X |
| 3,180,356 | 4/1965 | Galley | 137/495 |
| 3,856,042 | 12/1974 | Fletcher | 137/505.42 |

OTHER PUBLICATIONS

Drawing Nos. 2548, 2729, and 70-1000; 8-1967; Tescom Corporation; Minneapolis, Minn.

*Primary Examiner*—Robert G. Nilson
*Attorney, Agent, or Firm*—George R. Clark; Neil M. Rose; Allen J. Hoover

[57] ABSTRACT

A remote-controlled pressure regulator comprises a stepping motor, which is operatively connected to a tiltable arm engaging a connecting rod, so as to adjust loading of a pressure-regulating unit.

2 Claims, 1 Drawing Figure

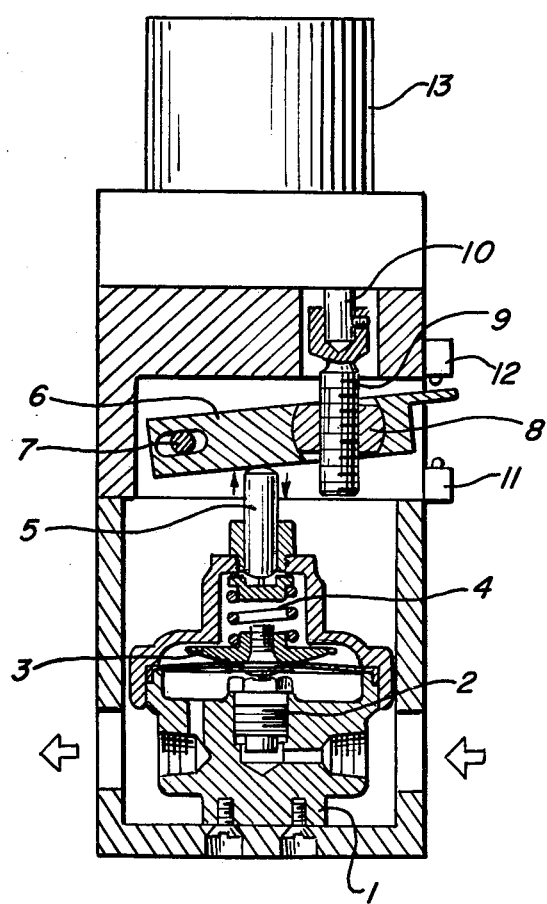

REMOTE-CONTROLLED PRESSURE REGULATOR

BACKGROUND OF THE INVENTION

The present invention relates to an improvement in a remote-controlled pressure regulator which is used, for example, in automatically controlling the pressure of treating gas used in the production of semiconductors or the like.

The pressure regulators heretofore used for controlling the pressure of noxious or explosive gas are of the manual adjustment type with an ordinary manipulating or adjusting knob, even when the pressure regulator is performed automatically. These conventional pressure regulators are unsatisfactory in terms of safety so that demand has arisen for pressure regulators which can be controlled not by hand but remotely be means of an electric motor or the like, and such remote-controlled pressure regulators have come into use.

In the existing remote-controlled pressure regulators, however, the control shaft of a pressure-regulating unit and the output shaft of the drive motor are coupled to each other by means of a spline, which is susceptible to backlash. The backlash has a detrimental affect upon the precision of the pressure control, and there is a deterioration in the starting and stopping precision for driving a D.C. motor. Moreover, the D.C. driving motor inevitably produces electric sparks, which may cause an accident particularly when the pressure regulator is used in the atmosphere of an explosive gas, so that there are problems in maintaining safety in the manufacture of semiconductors.

SUMMARY OF THE INVENTION

It is, therefore, an object of this invention to provide a remote-controlled pressure regulator capable of effecting fine control of pressure with a precision enhanced by one decimal place, thereby to eliminate the above-mentioned problems of the prior art.

It is another object of this invention to ensure the safety of operation of the pressure regulator by substituting a spark-free motor for the conventionally used D.C. motor for driving the remote-controlled pressure regulator.

A preferred embodiment of this invention will be described hereinunder with reference to the sole accompanying drawing.

BRIEF DESCRIPTION OF THE DRAWING

The drawing is a view, substantially in vertical half-section, of a preferred embodiment of this invention.

DETAILED DESCRIPTION OF PREFERRED EMBODIMENT

Referring to the drawing, a remote-controlled pressure regulator of the invention has a pressure-regulating unit 1 with a load spring 4. A connecting shaft 5 has one end slidably provided above the load spring 4 and another end which is constantly pressed against an intermediate portion of a tiltable arm 6 pivotally held at one end by means of a hinge pin 7 while the other end is coupled to an output shaft 10 of a stepping motor 13. Upper and a lower limit switches 12, 11 are disposed within the range of tilting movement of the tiltable arm 6. The connection between the output shaft 10 of the stepping motor 13, and the tiltable arm 6 is made through a driving bolt 9. Reference numerals 8, 2 and 3 denote, respectively, a driving nut, a main valve and a diaphragm assembly.

As shown, the stepping motor 13 is mounted on and to an upper housing, in which the hinge pin 7 is mounted and the tiltable arm 6 is accommodated. As shown, the pressure-regulating unit 1 is mounted in and to a lower housing, which accommodates fittings (not shown) for gas flowing through the pressure-regulating unit 1, as regulated by cooperation of the main valve 2, the diaphragm assembly 3, and the load spring 4, and as suggested by arrows.

As shown, the driving nut 8 is seated within a socket in the tiltable arm 6. The driving nut 8 and the socket are shaped so as to enable the tiltable arm 6 to rotate about the driving nut 8 upon tilting movement of the tiltable arm 6, but so as to prevent rotation of the driving nut 8 with the driving bolt 9. The tiltable arm 6 has an elongated slot, which accommodates the hinge pin 7, so as to allow the axis of tilting movement to shift along the tiltable arm 6.

In operation, the driving bolt 9 fixed to the output shaft 10 of the stepping motor 13 is rotated as the latter is energized, so that the driving nut 8 engaging the driving bolt 9 is moved up and down to tilt the tiltable arm 6 which in turn compresses or releases the load spring 4 via the connecting shaft 5. In consequence, the main valve 2 is opened and closed to automatically regulate the gas pressure, while constantly maintaining the balance between the force exerted by the load spring 4 and the force exerted by the diaphragm assembly 3 under the influence of the gas pressures at the inlet and outlet sides of the pressure regulating unit 1. The upper and lower limit switches limit the stroke or range of tilting movement of the tiltable arm 6 or set the operating pressure of the pressure regulator. The stepping motor is started and stopped when the output voltage of the stepping motor is low.

As has been described, according to the invention, the connecting shaft 5 disposed above the load spring 4 is continuously pressed by the latter against an intermediate portion of the tiltable arm 6 to eliminate the backlash which occurs in the conventional remote-controlled pressure regulators having a spline connection. The pressing action of the load spring also reduces the backlash between the driving bolt 9 and the driving nut 8. Even if such backlash does occur, its influence on the connecting shaft 5 is greatly diminished by lever action since the shaft 5 is pressed against the intermediate portion of the lever 6.

From the foregoing description, it will be understood that the remote-controlled pressure regulator of the invention provides a higher pressure regulator precision. In fact, examples show that the remote-controlled pressure regulator of the invention offers an improvement in precision, namely, a precision on the order of 0.02 atm., as compared to a precision of about 0.1 atm. with the conventional remote-controlled pressure regulator.

In addition, sparking when the stepping motor is started and stopped is avoided by switching the step of the stepping motor when the voltage is low, so that problems caused by the sparking are prevented. It is thus possible to provide a controlled pressure regulator which can be used with greater safety even for noxious gases and liquids, as well as for explosive gases and liquids. It should also be noted that, since the electric sparking is suppressed, an opened type motor can be used in place of closed type motor.

The upper and lower limit switches 12 and 11 protect the pressure regulator against damage and permit an enlargement of magnification of set pressure.

We claim:

1. A remote-controlled pressure regulator comprising
   (a) a pressure-regulating unit, which has a load spring,
   (b) a connecting shaft, which has an inner end and an outer end, which is operatively associated with the pressure-regulating unit so as to permit axial movement of the connecting shaft, and which is operatively associated with the load spring at the inner end of the connecting shaft so as to increase loading of the load spring upon axial movement of the connecting shaft in one axial direction, and so as to decrease loading of the load spring upon axial movement of the connecting shaft in an opposite direction,
   (c) an arm, which is pivotally supported at one end of the arm, and which engages the outer end of the connecting shaft at an intermediate portion of the arm so as to effect axial movement of the connecting rod so as to increase loading of the load spring upon pivotal movement of the arm in one pivotal sense, and so as to decrease loading of the load spring upon pivotal movement of the arm in an opposite sense,
   (d) a stepping motor, which has an output shaft that is operatively connected to the arm so as to effect pivotal movement of the arm in opposite pivotal senses, as the output shaft is driven in opposite rotational senses by the stepping motor, and
   (e) a pair of limit switches, which are respectively mounted to the framework so as to be engaged by the arm, at one extreme of a range of pivotal movement of the arm, and which are operatively associated with the stepping motor.

2. The remote-controlled pressure regulator of claim 1 wherein the output shaft of the stepping motor is operatively connected to the arm by means of a driving bolt.

* * * * *

UNITED STATES PATENT OFFICE
CERTIFICATE OF CORRECTION

PATENT NO. : 4,265,270
DATED : May 5, 1981
INVENTOR(S) : Ryozo Satoh

It is certified that error appears in the above-identified patent and that said Letters Patent are hereby corrected as shown below:

On the title page, in column 1, after the line showing the filing date of March 4, 1980, the following data should appear:

[30] Foreign Application Priority Data
March 8, 1979 [JP] Japan ... 54-26939

Signed and Sealed this

Fourteenth Day of July 1981

[SEAL]

Attest:

GERALD J. MOSSINGHOFF

Attesting Officer     Commissioner of Patents and Trademarks